April 10, 1956 — J. F. CHAMBERLIN ET AL — 2,741,490
CART FOR GOLF BAGS
Filed May 12, 1953 — 2 Sheets-Sheet 1
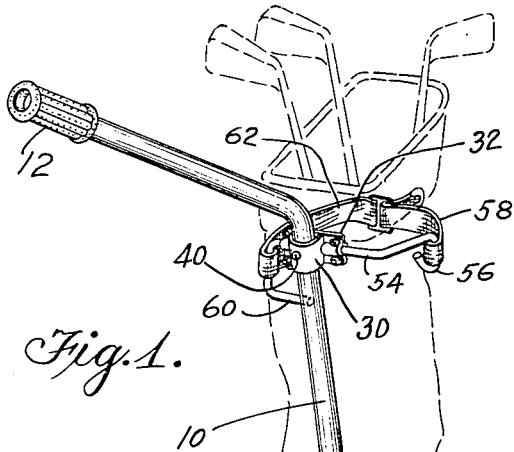
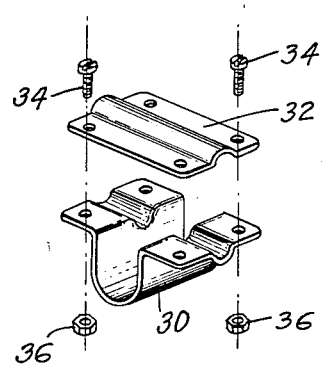
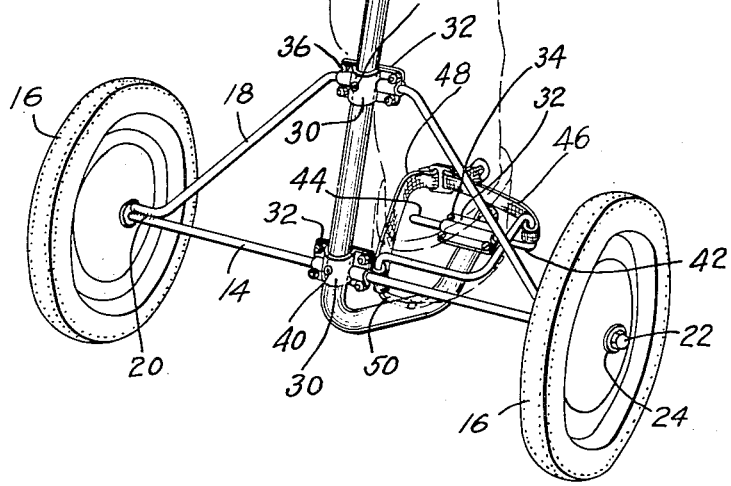
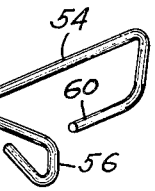
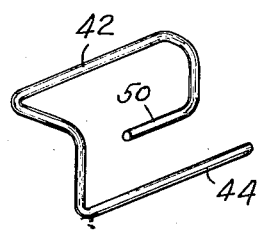
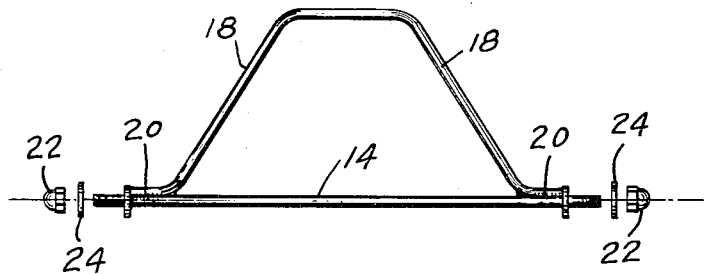
INVENTORS.
Joseph F. Chamberlin.
BY Robert A. Westphal.
ATTORNEY.

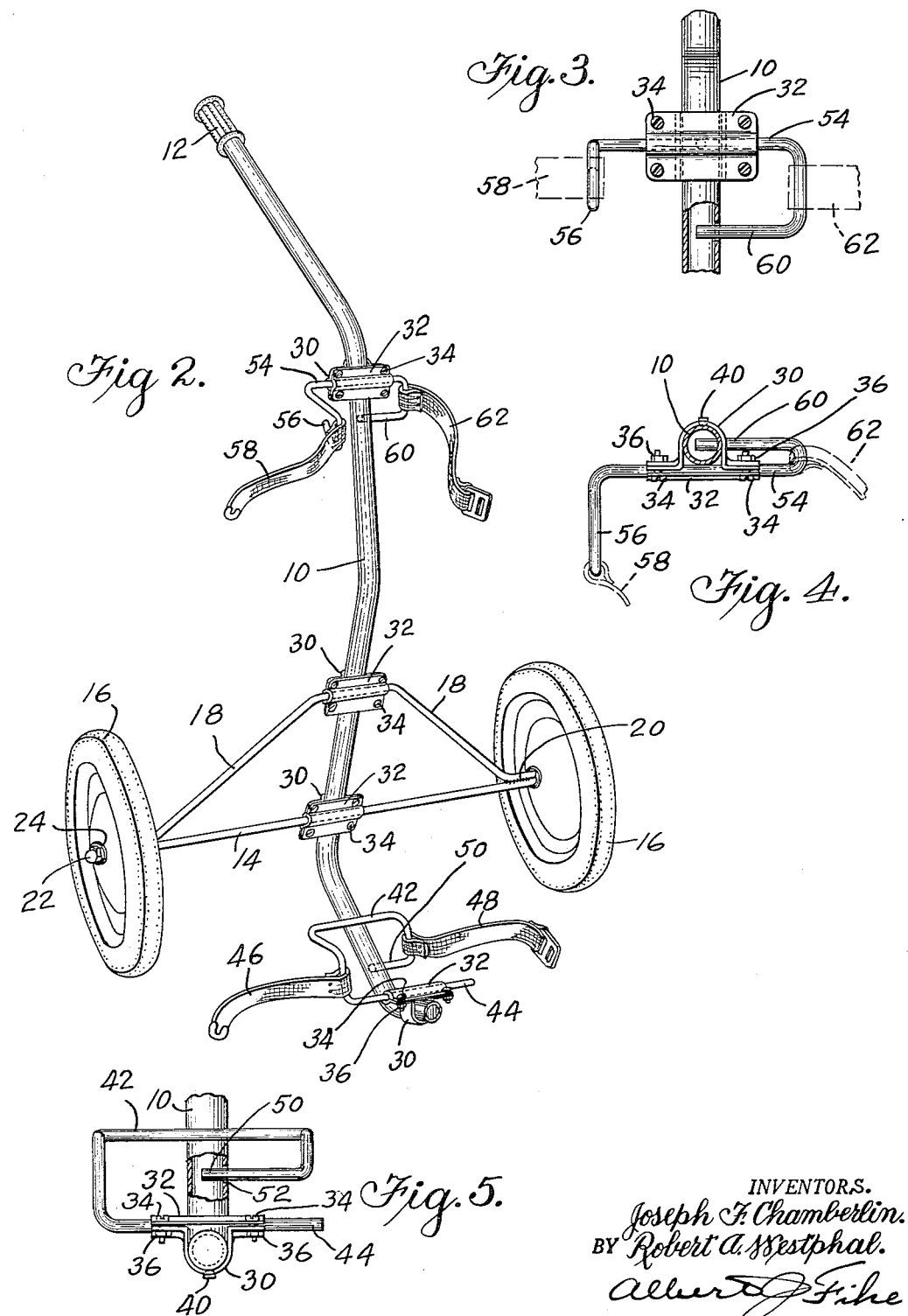

United States Patent Office 2,741,490
Patented Apr. 10, 1956

2,741,490

CART FOR GOLF BAGS

Joseph F. Chamberlin and Robert A. Westphal, Chicago, Ill.; said Westphal assignor to said Chamberlin Application May 12, 1953, Serial No. 354,488

1 Claim. (Cl. 280—47.26)

This invention relates to an improved cart for golf bags, and has for one of its principal objects the provision of a simplified, sturdy and efficient cart for transporting a golf bag and clubs over a golf course or the like.

One of the important objects of this invention is the provision in a cart for golf bags, of a construction which comprises a minimum number of parts, which parts can be shipped in quantity in knocked-down condition, and which can be assembled by the purchaser in a very short time and with a minimum of tools and labor.

Another important object of the invention is to provide a carrying cart for golf bags which is composed of materials which are practically standard, but which when assembled will provide in a unitary structure a cart capable of carrying even the heaviest bag or other loads with considerable ease.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective view of the improved carrying cart for golf bags of this invention, showing the same as having a golf bag and clubs mounted thereon.

Figure 2 is also a perspective view of the cart but showing the same from the front and with the golf bag removed.

Figure 3 is an enlarged detail view of the upper element which supports and maintains the golf bag in position on the cart.

Figure 4 is a view of the structure of Figure 3, looking at the same from the top.

Figure 5 is an enlarged detail view of the support for the lower end of the golf bag, showing the same as fastened on the cart.

Figure 6 is a plan view of the axle for the wheels and its supporting struts and associated elements.

Figure 7 is an exploded view showing one of the clevises or clamps which maintain the various parts in position on the main tubular body portion.

Figure 8 is a perspective view of the shaped rod which comprises part of the support for the upper portion of the golf bag.

Figure 9 is a perspective view of the shaped support which is for the lower portion to the golf bag.

As shown in the drawings:

The reference numeral 10 indicates generally the main body portion of the improved golf bag cart of this invention, the same comprising a tubular element bent to shape as shown, and provided with a handle 12 at its upper end.

The axle 14 is provided for the wheels 16 of the cart, and this axle is fastened to the tubular element 10 adjacent the right angle bend which defines its lower portion, and the axle is mounted forwardly of the tube 10. A support or brace for the axle is provided as shown at 18, and this is also fastened forwardly of the tube 10 at a point above the point of connection of the axle with the tube. The axle 14 and its brace 18 are preferably composed of metal rod and the ends of the brace 18 are bent to parallel the axle and are welded to the axle at 20. The wheels 16 fit on to extensions of the axle as shown, and are held in position by nuts and washers 22 and 24.

Two-part clevises or clamps 30—32 fasten the axle 14 and its bracket 18 in desired position on the tube 10, and this clamping structure is best illustrated in the exploded view of Figure 7. Bolts 34 and nuts 36 serve to hold these portions together about the tube 10, and the axle and bracket and set screws 40 are provided whereby any undesired turning of the assembled elements about the tube 10 is prevented.

A support for the bottom of the golf bag is provided at the lower end of the tube 10, this support being indicated by the reference numeral 42, and being composed of metal rod similar to that from which the axle and its bracket are fashioned. This rod is bent to conform to desired requirements, having a horizontal portion 44 which is fastened to the tube 10 by means of the plate and clevis combination 30—32, and including an upright part about which one end of the golf bag supporting strap 46 is fastened.

The far end of the rod-like support 42 is bent downwardly to receive the fastening strap 48 and thence inwardly as shown at 50 to enter an opening 52 in the adjacent portion of the tube 10. This provides for a very solid construction which cannot shift, even under very strenuous use.

The upper support includes a rod element 54 which is fastened by a clevis and plate combination to the forward portion of the tube 10, and has one end bent downwardly and thence back inwardly as shown at 56, to support a strap 58.

The other end is also bent downwardly and inwardly with its end 60 fitted into a hole in the upper part of the tube 10. A strap 62 is attached as best shown in Figures 2 and 4.

It will be seen that herein is provided a golf cart composed of the minimum number of parts, which parts can be shipped in quantities in disassembled lots, and which can later be assembled into a complete cart by the purchaser, thereby eliminating the necessity for a great deal of storage space, and expensive packing and shipping costs. The resultant cart is sturdy and dependable, and being composed of the minimum of parts, is not likely to get out of order. It is so constructed that it will support practically any type of golf bag with little or no changes and adjustments, and the bag can be placed on the cart in several positions without detracting in any way from the efficiency of the assemblage. The construction is such, and the handle portion is at a desired angle with respect to the remainder of the body, that when the cart is moved to bag propelling position, the handle will be substantially parallel with the ground, and the weight of the bag and clubs will be centered over the axle. The positioning of the axle and its support forwardly of the body insures this balancing action, which provides a highly desirable ease of operation, and a game of golf can be enjoyed with the minimum of physical effort.

The angle of bend at the bottom of the tubular body portion 10 and the angle of bend in the middle thereof, together with the angle of bend which locates the handle, are all carefully calculated so that when the golf bag with clubs is placed on the cart, the center of weight will be over the axle 14 just above the bend which outlines the lower portion of the cart body and the relationship of this location to the location of the struts 18 with respect to the body is such that the clamping connection between the brace 18 and the body is approximately half-way between the bend which defines the ground contacting portion of the body and the bend adjacent the middle of the tubular body portion.

The angle of the body portion above this middle bend is such that when a golf bag is fastened on to the cart, it is in parallelism with the upper half of the body, but diverges forwardly from the lower half of the body, all as best shown in Figure 1. This insures a proper distribution of weight, particularly in that the axle 14 and its supporting brace 18 are both located forwardly of the tubular body 10.

When the cart is allowed to tilt forwardly to assume a fixed position whereby the golfer can select and use a club, the lowermost part of the body 10 contacts the ground, maintains the cart in a stable position, and the curved contour of this lower forwardly bent end of the tubular body 10 is such that no marring of the ground surface will result, even if the cart is skidded along the ground for a short distance. In all cases, the lower part of the bag itself is spaced away from the tubular body, and also from the axle, but the axle itself is located forwardly of the body. The angle between the ground contacting portion of the body and the main body portion is obtuse as is also the angle between the handle and the main body portion, both being slightly more than 90 degrees. The angle at the medial portion of the body is quite obtuse, being only slightly less than 180 degrees. These angles, and the other proportions of the cart can of course be varied as the situation requires or as conditions change.

When the player desires to use a club, he simply releases the handle or pushes it upwards slightly, when the cart and bag will assume the position shown in Figure 1, with the forwardly bent portion of the tubular body 10 resting on the ground, whereby the bag itself, with the clubs, will be maintained in a substantially vertical position, rendering it easy for the player to select, use and replace any particular club.

The combination of straps and supports for the bag is such that the straps can be pulled tightly and buckled into position without collapsing the bag, which, if it occurred, would interfere with the ready handling of the clubs.

We are aware that many changes may be made and numerous details of construction varied throughout a wide range without departing from the principles of this invention, and we therefore do not purpose limiting the patent granted hereon otherwise than as necessitated by the prior art.

We claim as our invention:

A wheeled golf bag cart adapted to swing from a stable, vertical, immobile position, to an inclined, balanced and laterally stable mobile position, with the center of mass over the wheels, comprising a body including a tube bent at its upper end to form a propelling handle, and at its lower end to provide a support for the bottom of a golf bag, said support adapted to rest on the ground when the cart is in immobile position, a horizontal axle for the wheels positioned forwardly of the body adjacent the point where it is bent to provide the ground contacting portion, a supporting brace for the axle mounted forwardly of the tubular body and above the axle, supports on the body for the top and bottom of a golf bag, each support comprising a rod bent to shape to fit the bag and to receive bag holding straps and removable clamping means connecting the rod-like supports to the body, similar removable clamping means connecting the axle and its brace to the body, the rods having spaced-apart ends and the tubular body having openings therein adjacent the supports for the reception of one end of each of the rods and golf bag encircling straps on the rod-like supports, said supports encompassing approximately one half of the bag, and the straps encompassing the other half.

References Cited in the file of this patent

UNITED STATES PATENTS

| | | |
|---|---|---|
| D. 157,597 | Huber | Mar. 7, 1950 |
| 2,236,053 | Caron | Mar. 25, 1941 |
| 2,335,579 | Chamberlin et al. | Nov. 30, 1943 |
| 2,425,107 | Martin | Aug. 5, 1947 |
| 2,687,895 | Rutledge | Aug. 31, 1954 |